United States Patent
Lee

(10) Patent No.: US 10,330,991 B1
(45) Date of Patent: Jun. 25, 2019

(54) LIQUID CRYSTAL DISPLAY DEVICES WITH ELECTRODE STACKS AND METHODS FOR MANUFACTURING SUCH DEVICES

(71) Applicant: a.u. Vista Inc., Milpitas, CA (US)

(72) Inventor: Seok-Lyul Lee, Hsinchu (TW)

(73) Assignee: A.U. VISTA INC., Milpitas, CA (US)

( * ) Notice: Subject to any disclaimer, the term of this patent is extended or adjusted under 35 U.S.C. 154(b) by 0 days.

(21) Appl. No.: 15/993,826

(22) Filed: May 31, 2018

(51) Int. Cl.
| | | |
|---|---|---|
| G02F 1/133 | (2006.01) | |
| G02F 1/135 | (2006.01) | |
| G02F 1/1333 | (2006.01) | |
| G02F 1/1335 | (2006.01) | |
| G02F 1/1343 | (2006.01) | |
| G02F 1/1362 | (2006.01) | |

(52) U.S. Cl.
CPC .... *G02F 1/134309* (2013.01); *G02F 1/13306* (2013.01); *G02F 1/133345* (2013.01); *G02F 1/133512* (2013.01); *G02F 1/136286* (2013.01); *G02F 2001/1357* (2013.01); *G02F 2201/121* (2013.01); *G02F 2201/123* (2013.01); *G09G 2300/0421* (2013.01)

(58) Field of Classification Search
CPC combination set(s) only.
See application file for complete search history.

(56) References Cited

U.S. PATENT DOCUMENTS

| | | | | |
|---|---|---|---|---|
| 2007/0097303 A1* | 5/2007 | Sonoda | ............ | G02F 1/133345 349/122 |
| 2008/0316385 A1 | 12/2008 | Matsumura et al. | | |
| 2009/0040442 A1* | 2/2009 | Tanno | ............... | G02F 1/133555 349/114 |
| 2012/0193630 A1* | 8/2012 | Ham | ................ | G02F 1/134309 257/59 |
| 2014/0132906 A1* | 5/2014 | Yoshioka | .......... | G02F 1/134309 349/141 |
| 2016/0238888 A1* | 8/2016 | Yao | ................... | G02F 1/133528 |
| 2016/0370622 A1* | 12/2016 | Kim | ................... | G02F 1/134363 |
| 2017/0039975 A1* | 2/2017 | Ito | ....................... | G02F 1/13306 |
| 2017/0090255 A1* | 3/2017 | Murata | ............ | G02F 1/133345 |
| 2017/0242305 A1* | 8/2017 | Liao | ..................... | G09G 3/3677 |

* cited by examiner

*Primary Examiner* — Paul C Lee
(74) *Attorney, Agent, or Firm* — McClure, Qualey & Rodack, LLP

(57) ABSTRACT

A representative device includes: first and second substrates defining a gap; a liquid crystal layer, in the gap, having display pixels; and transparent electrode stacks disposed between the first substrate and the liquid crystal layer; wherein each of the stacks has a first common electrode, a pixel electrode, and a second common electrode, with the first common electrode being positioned between the first substrate and the pixel electrode, and the pixel electrode being positioned between the first common electrode and the second common electrode; and wherein, in plan view, a width of the pixel electrode is wider than a width of the second common electrode as measured along a first direction, and the second common electrode is positioned to expose a first portion of the pixel electrode at a first side of the second common electrode and a second portion of the pixel electrode at a second opposing side of the second common electrode.

20 Claims, 11 Drawing Sheets

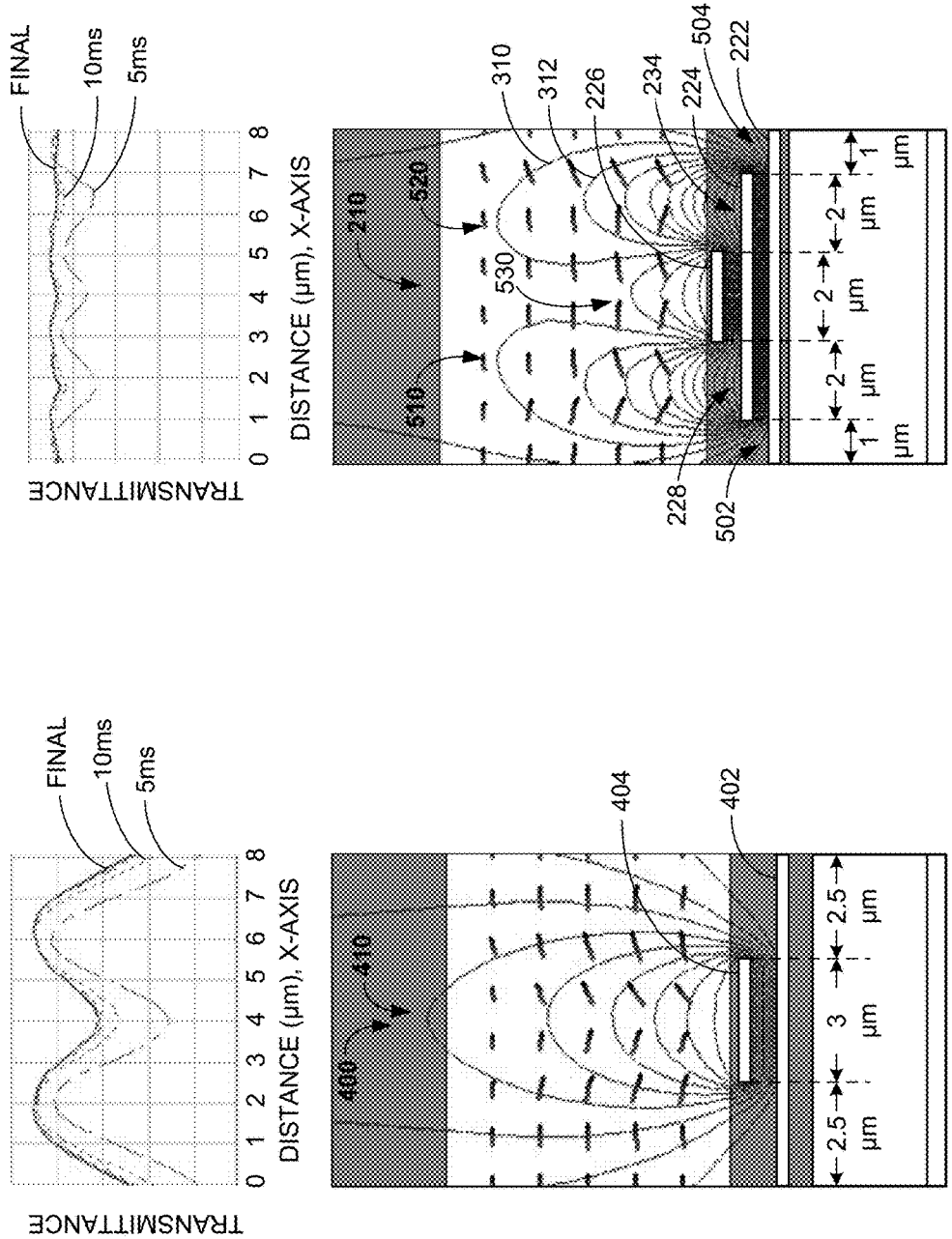

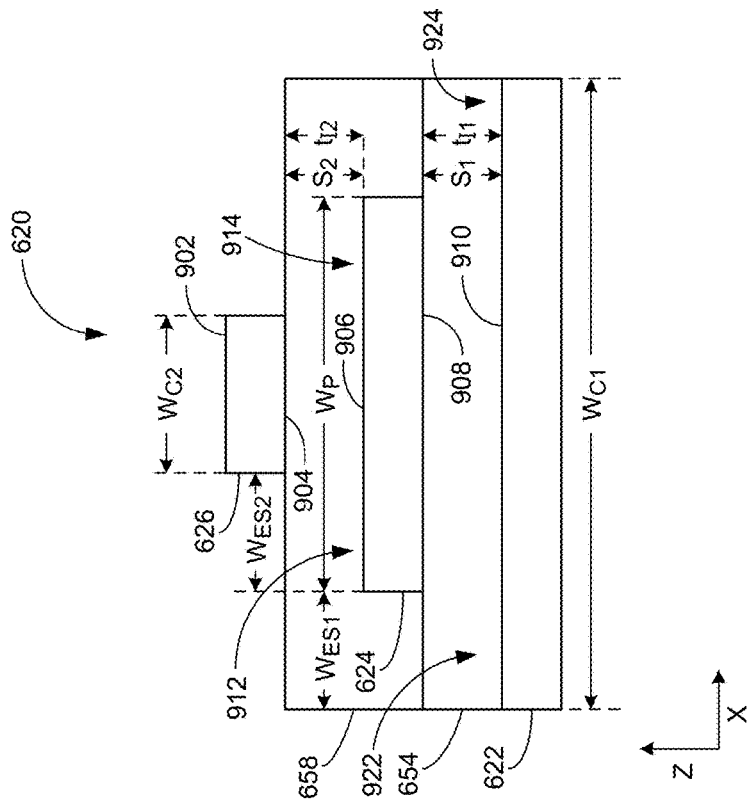
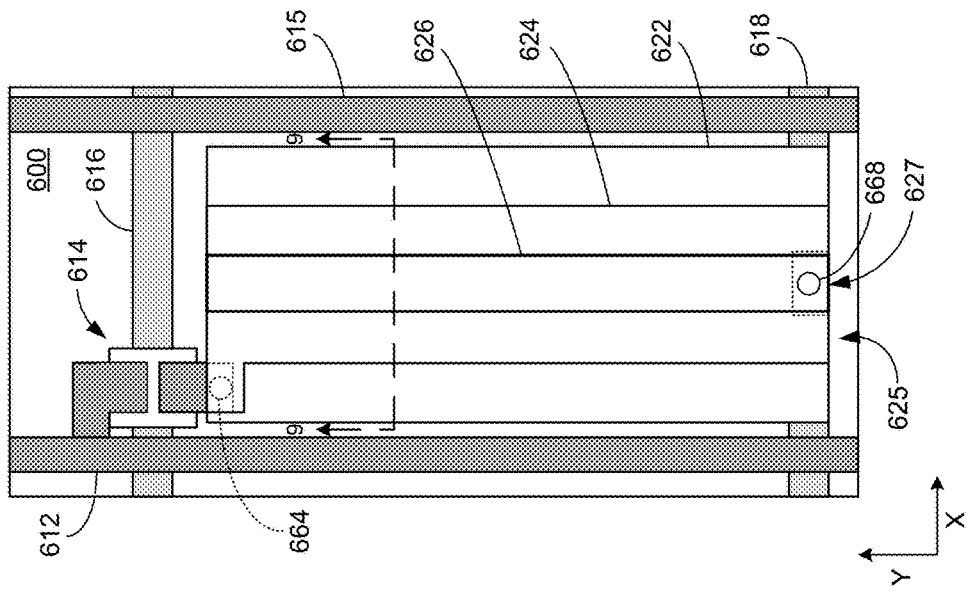

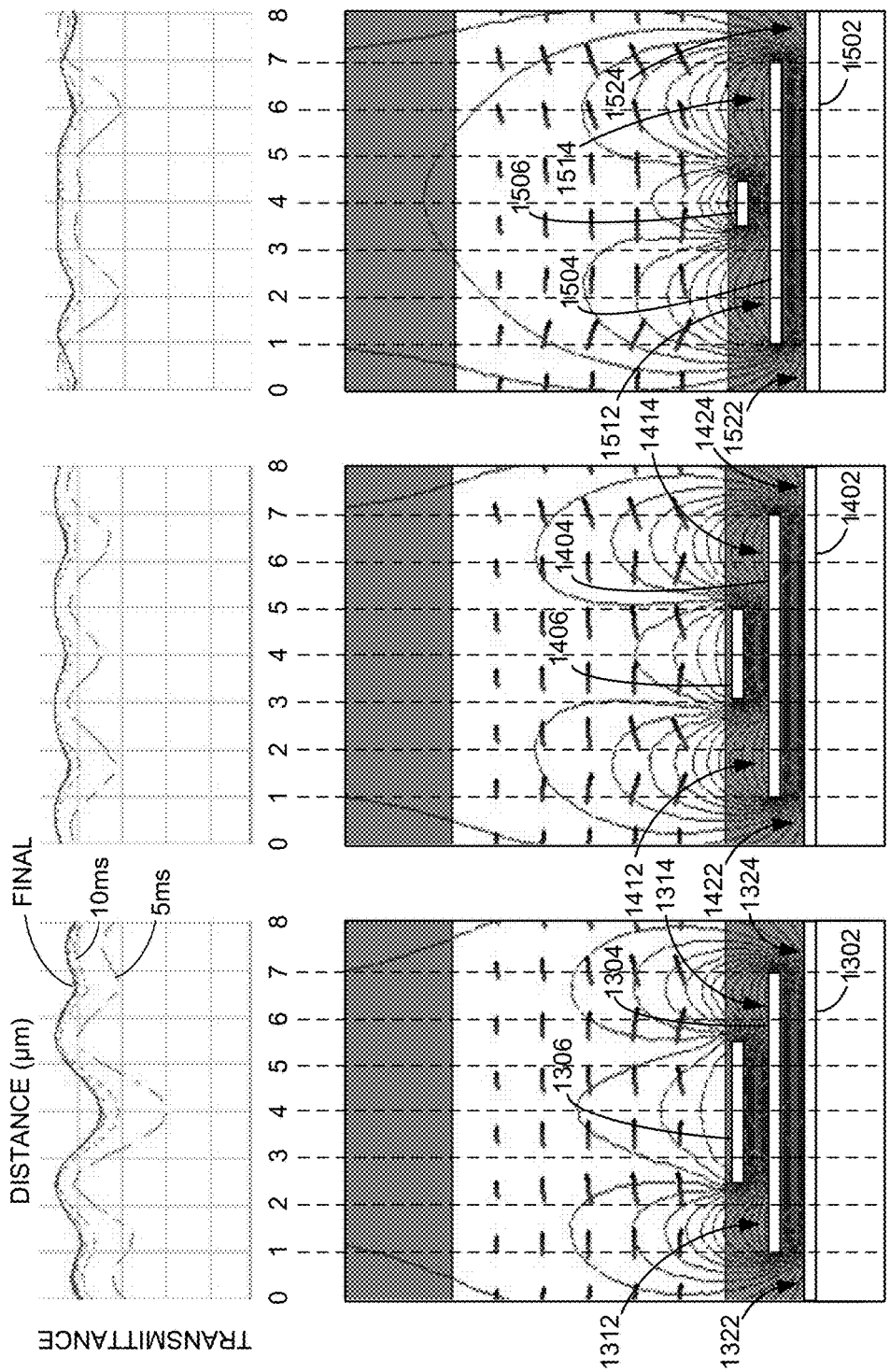

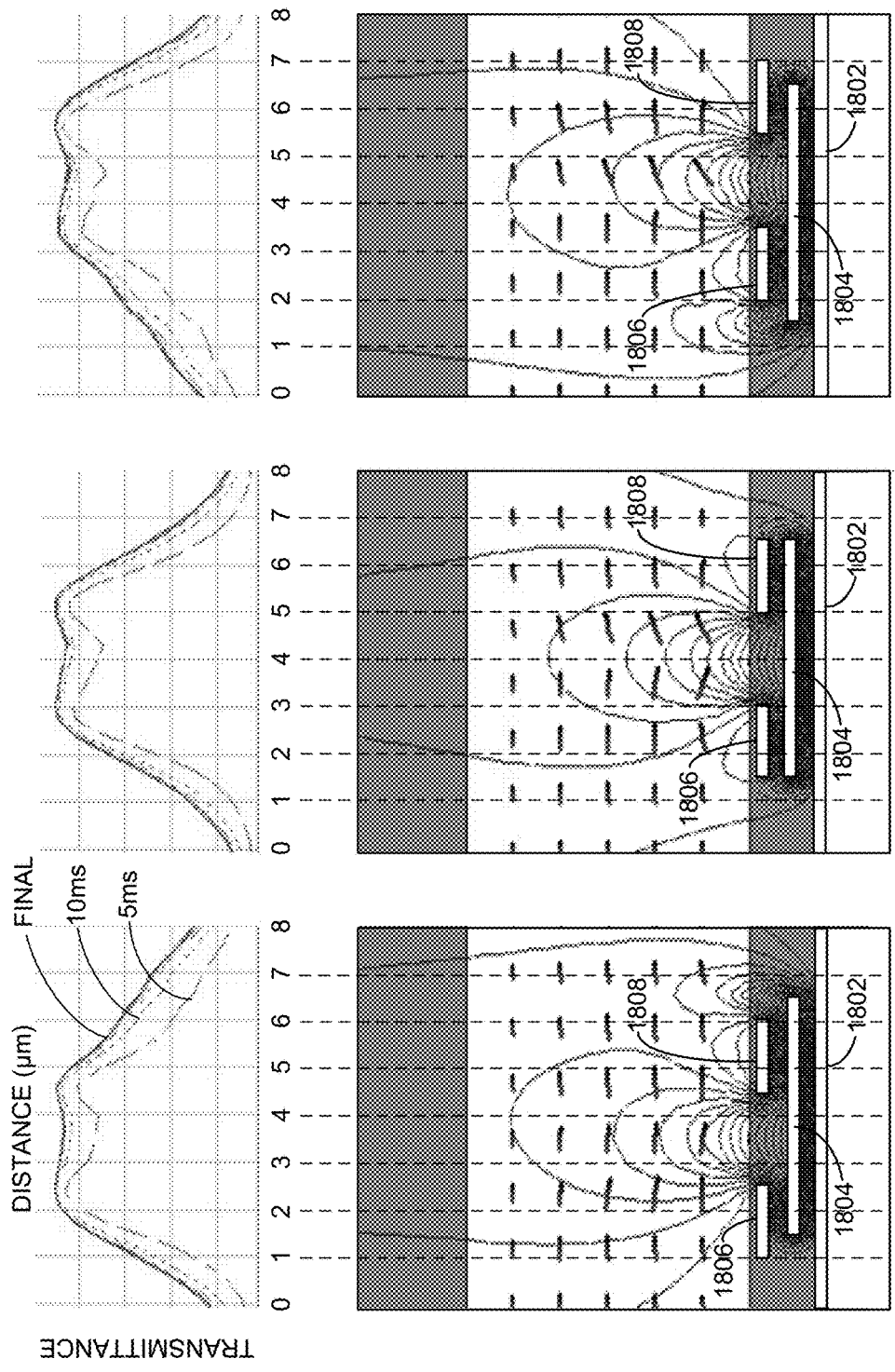

LIQUID CRYSTAL DISPLAY DEVICES WITH ELECTRODE STACKS AND METHODS FOR MANUFACTURING SUCH DEVICES

BACKGROUND

Technical Field

The disclosure generally relates to display technology.

Description of the Related Art

Various display technologies (e.g., liquid crystal displays (LCDs)) are widely used in displays for electronic devices, such as laptops, smart phones, digital cameras, billboard-type displays, and high-definition televisions. In addition, other display technologies, such as organic light-emitting diodes (OLEDs) and electronic paper displays (EPDs), are gaining in public attention.

LCD panels may be configured as disclosed, for example, in Wu et al., U.S. Pat. No. 6,956,631, which is assigned to AU Optronics Corp., the parent company of the assignee of the current application, and hereby incorporated by reference in its entirety. As disclosed in Wu et al. FIG. 1, the LCD panel may comprise a top polarizer, a lower polarizer, a liquid crystal cell, and a back light. Light from the back light passes through the lower polarizer, through the liquid crystal cell, and then through the top polarizer. As further disclosed in Wu et al. FIG. 1, the liquid crystal cell may comprise a lower glass substrate and an upper substrate containing color filters. A plurality of pixels comprising thin film transistor (TFT) devices may be formed in an array on the glass substrate, and a liquid crystal compound may be filled into the space between the glass substrate and the color filter forming a layer of liquid crystal material.

Still, the structure of TFTs in displays may be various. For instance, The TFTs, gate and data lines, and pixel electrodes may be formed in a multilayer structure such as that shown in FIGS. 1 and 2E of Lai et al., U.S. Pat. No. 7,170,092 and in its division U.S. Pat. No. 7,507,612, both of which are assigned to AU Optronics Corp., the parent company of the assignee of the current application, and both of which are hereby incorporated by reference in their entireties. The multilayer structure may comprise a first conducting layer, a first insulating layer, a semiconductor layer, a doped semiconductor layer, and a second conducting layer disposed in sequence on the substrate. It may further comprise a second insulating layer and a pixel electrode disposed on the second insulating layer. The first conducting layer may comprise at least one of a gate line or a gate electrode. The doped semiconductor layer may comprise a source and a drain. The second conducting layer may comprise a source electrode and a drain electrode. The multilayer structure may be formed using a series of wet and dry etching processes, for example as disclosed in Lai et al. FIGS. 2A-2D.

Additional techniques for forming TFTs are disclosed in Chen, U.S. Pat. No. 7,652,285, which is assigned to AU Optronics Corp., the parent company of the assignee of the current application, and hereby incorporated by reference in its entirety. As disclosed in Chen, to form the channel of the TFT, the second metal layer is etched in order to open a portion of the second metal layer over the gate electrode and to separate the source region and drain region. This etching can be performed in multiple ways, including the back-channel etching process disclosed for example in Chen FIGS. 2A-2E and the etch stop process disclosed for example in Chen FIGS. 5A-5D and 6. Chen discloses that TFT leakage currents may be reduced by adding a spacer layer formed at the sidewalls of the conductive doped amorphous silicon layer, isolating the conductive amorphous silicon layer from the insulating layer. Chen discloses that this spacer layer can be formed by oxidizing the exposed surface of the conductive amorphous silicon layer after the etch of the second metal layer is performed. Chen discloses that this surface may be oxidized by a number of different techniques, including oxygen plasma ashing, or the use of ozone plasma in the presence of carbon tetrafluoride and sulfur hexafluoride gases As explained in Sawasaki et al., U.S. Pat. No. 7,557,895, which is assigned to AU Optronics Corp., the parent company of the assignee of the current application, and hereby incorporated by reference in its entirety, the thickness of the liquid crystal layer typically must be uniformly controlled, in order to avoid unevenness in brightness across the LCD panel. As disclosed in Sawasaki et al., the required uniformity may be achieved by disposing a plurality of pillar spacers between the TFT substrate and the color filter substrate. As further disclosed in Sawasaki et al., the pillar spacers may be formed with different heights, such that some spacers have a height that is greater than the gap between the substrates and other spacers have a height that is less than the gap between the substrates. This configuration may permit the spacing between the substrates to vary with temperature changes but also prevent excessive deformation when forces are applied to the panel.

Sawasaki et al. further discloses a method for assembling the substrates with the liquid crystal material between them. This method comprises steps of preparing the two substrates, coating a sealing material on the circumference of the outer periphery of one of the pair of substrates, dropping an appropriate volume of liquid crystal on one of the pair of substrates, and filling in the liquid crystal between the pair of substrates by attaching the pair of substrates in a vacuum followed by returning the attached pair of substrates to atmospheric pressure.

In LCD panels, the semiconductor material making up the TFT channel may be amorphous silicon. However, as disclosed in Chen, U.S. Pat. No. 6,818,967, which is assigned to AU Optronics Corp., the parent company of the assignee of the current application, and hereby incorporated by reference in its entirety, poly-silicon channel TFTs offer advantages over amorphous silicon TFTs, including lower power and greater electron migration rates. Poly-silicon may be formed by converting amorphous silicon to poly-silicon via a laser crystallization or laser annealing technique. Use of the laser permits fabrication to occur at temperatures below 600° C., and the fabricating technique is thus called low temperature poly-silicon (LTPS). As disclosed in Chen, the re-crystallization process of LTPS results in the formation of mounds on the surface of the poly-silicon layer, and these mounds impact the current characteristics of the LTPS TFT. Chen discloses a method to reduce the size of the LTPS surface mounds, by performing a first anneal treatment, then performing a surface etching treatment, for example using a solution of hydrofluoric acid, and then performing a second anneal treatment. The resulting LTPS surface has mounds with a height/width ratio of less than 0.2. A gate isolation layer, gate, dielectric layer, and source and drain metal layers can then be deposited above the LTPS layer to form a complete LTPS TFT.

As disclosed in Sun et al., U.S. Pat. No. 8,115,209, which is assigned to AU Optronics Corp., the parent company of the assignee of the current application, and hereby incorporated by reference in its entirety, a disadvantage of LTPS TFTs compared to amorphous silicon TFTs is a relatively large leakage current during TFT turn off. Use of multiple gates reduces leakage current, and Sun et al. discloses a number of different multi-gate structures for a polycrystalline silicon TFT, including those shown in Sun et al. FIGS. 2A-2B and 3-6.

An alternative to LCD devices is the active matrix organic light-emitting device (OLED), as disclosed for example in Huang, U.S. Pat. No. 6,831,410, which is assigned to AU Optronics Corp., the parent company of the assignee of the current application, and hereby incorporated by reference in its entirety. As disclosed in Huang, a TFT is formed over a substrate. An insulating layer is formed, covering the TFT. A contact opening is formed in the insulating layer, exposing the drain terminal of the TFT, and an anode layer is formed over the insulating layer and the exposed opening, forming a contact between the anode layer and the TFT drain terminal. A light-emitting layer is formed over the anode layer, and a cathode layer is formed over the light-emitting layer. As explained in Huang, there is a risk that the cathode layer will form a short circuit with the anode layer via the contact opening. To prevent such short circuits, Huang discloses depositing a planarization layer that fills the space above the contact. The light-emitting and cathode layers are then formed over the planarization layer.

In a conventional twisted nematic (TN) mode LCD device, when the liquid crystal molecules are in tilted orientations, light from the direction of incidence is subject to various different indexes of reflection. Since the functionality of LCD devices is based on the birefringence effect, the transmittance of light will vary with different viewing angles. Due to such differences in light transmission, optimum viewing of an LCD device typically is limited within a narrow viewing angle. The limited viewing angle of LCD devices tends to be one of the major disadvantages associated with LCD devices and is a factor in restricting applications of LCD devices.

Several approaches exist for increasing the viewing angles of LCD devices, such as in-plane switching (IPS) and fringe field switching (FFS). In this regard, a typical IPS mode LCD device includes a structure that uses two pixel electrodes, which are formed on a surface of a first substrate in parallel, along with a common electrode for driving liquid crystal molecules. When a voltage is applied to the pixel electrodes and the common electrode, an electric field is generated in-plane to the surface of the first substrate. In the IPS mode LCD device, a distance between the common electrode and the pixel electrode is about the same order as a cell gap (i.e., a distance between the first substrate and a second substrate that bound the liquid crystal molecules). The IPS mode LCD device has the potential advantage of a viewing angle that is wider than that of a conventional TN mode LCD device. However, since the pixel and the common electrodes are made of opaque metal films, there is often a limitation in aperture ratio and transmittance of light.

In order to overcome the perceived limitations of IPS mode LCD devices in aperture ratio and transmittance of light, FFS mode LCD devices have been introduced. In a typical FFS mode LCD device, a plurality of pixel electrodes and a common electrode are made of transparent conductive films (e.g., indium tin oxide films) to improve the aperture ratio compared to IPS mode LCD devices. When a voltage is applied between the pixel electrodes, a fringe field is generated in a region of the cell gap adjacent to the common and the pixel electrodes that drives all of the liquid crystal molecules disposed within the region. This tends to improve the transmittance of light compared IPS mode LCD devices.

However, in FFS mode LCD devices at high resolution (e.g., resolution over 700 ppi), LC efficiency and storage capacitance may be significantly decreased resulting lower brightness and increased flickering image defect.

Therefore, there is a desire for improvements that existing technology has been inadequate for addressing.

SUMMARY

Liquid crystal display devices with electrode stacks and methods for manufacturing such devices are provided. In one embodiment, a liquid crystal display device comprises: a first substrate; a second substrate spaced from the first substrate to define a gap therebetween; a liquid crystal layer, positioned in the gap, having a plurality of display pixels, wherein each of the display pixels is configured to be switchable between an on state and an off state; and a plurality of transparent electrode stacks disposed between the first substrate and the liquid crystal layer, with each of the plurality of transparent electrode stacks corresponding to at least one of the display pixels; wherein each of the plurality of transparent electrode stacks has a first common electrode, a pixel electrode, and a second common electrode, with the first common electrode being positioned between the first substrate and the pixel electrode, and the pixel electrode being positioned between the first common electrode and the second common electrode; and wherein, in plan view, a width of the pixel electrode is wider than a width of the second common electrode as measured along a first direction, and the second common electrode is positioned to expose a first portion of the pixel electrode at a first side of the second common electrode and a second portion of the pixel electrode at a second opposing side of the second common electrode.

In some embodiments, each of the plurality of transparent electrode stacks has only three electrodes.

In some embodiments, the liquid crystal display device further comprises a plurality of gate lines disposed on the first substrate; and the plurality of gate lines extend along the first direction.

In some embodiments, the liquid crystal display device further comprises: a plurality of common electrode lines disposed on the first substrate; the plurality of common electrode lines extend along the first direction; and each of the plurality of electrode common lines is electrically coupled to the first common electrode and the second common electrode of at least one of the plurality of transparent electrode stacks.

In some embodiments, a second distance between a top surface of the pixel electrode and a bottom surface of the second common electrode is equal to or smaller than a first distance between a top surface of the first common electrode and a bottom surface of the pixel electrode.

In some embodiments, measured along the first direction, a width of the first common electrode is wider than the width the pixel electrode.

In some embodiments, a second distance between a top surface of the pixel electrode and a bottom surface of the second common electrode is less than or equal to the width of the second common electrode.

In some embodiments, a first distance between a top surface of the first common electrode and a bottom surface of the pixel electrode is less than or equal to the width of the pixel electrode.

In some embodiments, each the plurality of transparent electrode stacks further comprises: a first insulator layer disposed between the first common electrode and the pixel electrode; and a second insulator layer disposed between the pixel electrode and the second common electrode.

In some embodiments, a thickness of the second insulator layer is less than a thickness of the first insulator layer.

In some embodiments, a thickness of the first insulator layer is less than 500 nm.

In some embodiments, the liquid crystal layer comprises nematic liquid crystals.

In some embodiments, the nematic liquid crystals exhibit a refractive index (n); the liquid crystal layer is disposed in the gap to a depth (d, µm); and a product of the refractive index and the depth (n×d) is in a range of about 0.15 µm to about 0.50 µm.

In some embodiments, the liquid crystal display device further comprises a black matrix disposed between the second substrate and the liquid crystal layer.

In some embodiments, the black matrix defines interstices; and the liquid crystal display device further comprises a color filter layer positioned at the interstices of the black matrix.

In some embodiments, the liquid crystal display device further comprises a transparent electrode disposed between the second substrate and the liquid crystal layer.

In one embodiment, a method of forming a liquid crystal display device comprises: providing a first substrate; disposing a plurality of transparent electrode stacks on the first substrate; providing a second substrate; positioning the first substrate and the second substrate to define a gap therebetween; and disposing a liquid crystal layer in the gap, the liquid crystal layer having a plurality of display pixels with each of the plurality of transparent electrode stacks corresponds to one of the display pixels, wherein each of the display pixels is configured to be switchable between an on state and an off state; wherein each of the plurality of transparent electrode stacks has a first common electrode, a pixel electrode, and a second common electrode, with the first common electrode being positioned between the first substrate and the pixel electrode, and the pixel electrode being positioned between the first common electrode and the second common electrode; and wherein, in plan view, a width of the pixel electrode is wider than a width of the second common electrode as measured along a first direction, and the second common electrode is positioned to expose a first portion of the pixel electrode at a first side of the second common electrode and a second portion of the pixel electrode at a second opposing side of the second common electrode.

In some embodiments, the method further comprises disposing a plurality of gate lines on the first substrate, with the plurality of gate lines extending along a first direction.

In some embodiments, a width, measured along the first direction, of the pixel electrode is wider than a width of the second common electrode; and a width, measured along the first direction, of the first common electrode is wider than the width the pixel electrode.

In some embodiments, the method further comprises disposing a plurality of common electrode lines on the first substrate, with the plurality of common electrode lines extending along the first direction and each of the plurality of electrode common lines being electrically coupled to the first common electrode and the second common electrode of at least one of the plurality of transparent electrode stacks.

Other objects, features, and/or advantages will become apparent from the following detailed description of the preferred but non-limiting embodiments. The following description is made with reference to the accompanying drawings.

BRIEF DESCRIPTION OF THE DRAWINGS

FIG. 4 is a schematic diagram depicting a cross-section of a prior art liquid crystal display device in an on state superimposed with a graph depicting transmittance of the device.

FIG. 5 is a schematic diagram depicting the embodiment of FIG. 2 in an on state superimposed with a graph depicting transmittance of the device.

FIG. 8 is a schematic diagram depicting a plan view of another embodiment of a lower substrate and associated features.

FIG. 9 is a schematic diagram depicting a cross-section of the electrode stack of FIG. 8, as viewed along section line 9-9.

FIGS. 13-15 are schematic diagrams depicting cross-sections of embodiments exhibiting variation in widths of pixel electrodes.

FIGS. 17-19 are schematic diagrams of prior art embodiments exhibiting optical variation due to misalignment.

DETAILED DESCRIPTION

For ease in explanation, the following describes several embodiments of liquid crystal display devices with electrode stacks and methods for manufacturing such devices. It is to be understood that the invention is not limited in its application to the details of the particular arrangements shown since the invention is capable of other embodiments. Also, the terminology used herein is for the purpose of description and not of limitation.

In this regard, as will be described in greater detail below, liquid crystal display devices with electrode stacks may involve the use of a pixel electrode disposed between two common electrodes for each of a plurality of the electrode stacks. In some embodiments, each electrode positioned higher in the stack exhibits a narrower width than electrodes positioned lower in the stack. In some embodiments, improvements in transmittance may be exhibited that is attributable to the ability of the electrode stack to cause rotation of liquid crystals throughout much of the pixel area without shadowing. Preferred embodiments of the present invention will now be described with reference to the drawings.

Figure 1:
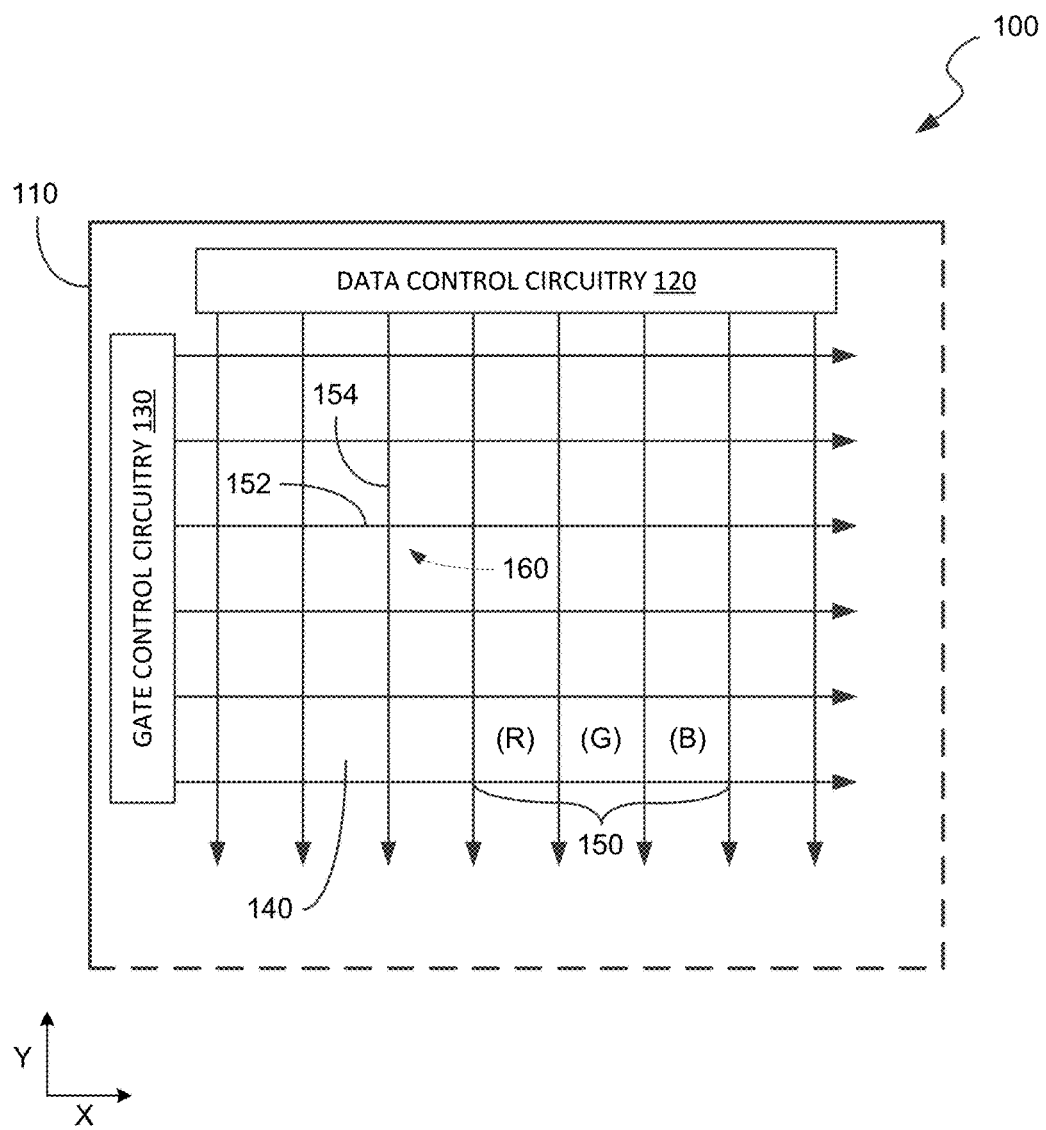
FIG. 1 is a schematic diagram of a portion of an embodiment of a liquid crystal display device.

With reference to FIG. 1, a portion of an embodiment of a liquid crystal display device 100 is depicted (plan view). Fundamentally, liquid crystal display device 100 includes an LCD panel 110 with data driver circuitry 120 and gate driver circuitry 130. The circuits and functions in the embodiments of the present invention can be implements by hardware, software or a combination of hardware and software such as microcontrollers, application-specific integrated circuits (ASIC) and programmable microcontrollers.

In keeping with the description of FIG. 1, panel 110 incorporates a plurality of pixels (typically thousands of pixels, e.g., pixels 140, 150), which are arranged in a two-dimensional array comprising a plurality of rows and columns. For ease in illustration, only a few pixels are illustrated in FIG. 1. As is known, in a thin film transistor (TFT) LCD panel, a pixel is typically formed from three pixel elements (sub-pixels): one red, one green, and one blue, although various configurations may be used. For instance, pixel 150 is depicted as including three sub-pixels—a red sub-pixel (R), a green sub-pixel (G), and a blue sub-pixel (B). One or more transistors and one or more storage capacitors are typically coupled to each sub-pixel, thereby forming driving circuitry for the associated sub-pixel.

The transistors of all pixels in a given row typically have their gate electrodes connected to a gate (scan) line (e.g., line 152), and their source electrodes connected to a data line (e.g., line 154). The gate driver circuitry 130 and data driver circuitry 120 control the voltage applied to the respective gate and data lines to individually address each sub-pixel in the panel. By controllably pulsing the respective sub-pixel driving transistors, the driver circuitry can control the transmissivity of each sub-pixel, and thereby control the color of each pixel. The storage capacitors assist in maintaining the charge across each pixel between successive pulses (which are delivered in successive frames).

Figure 2:
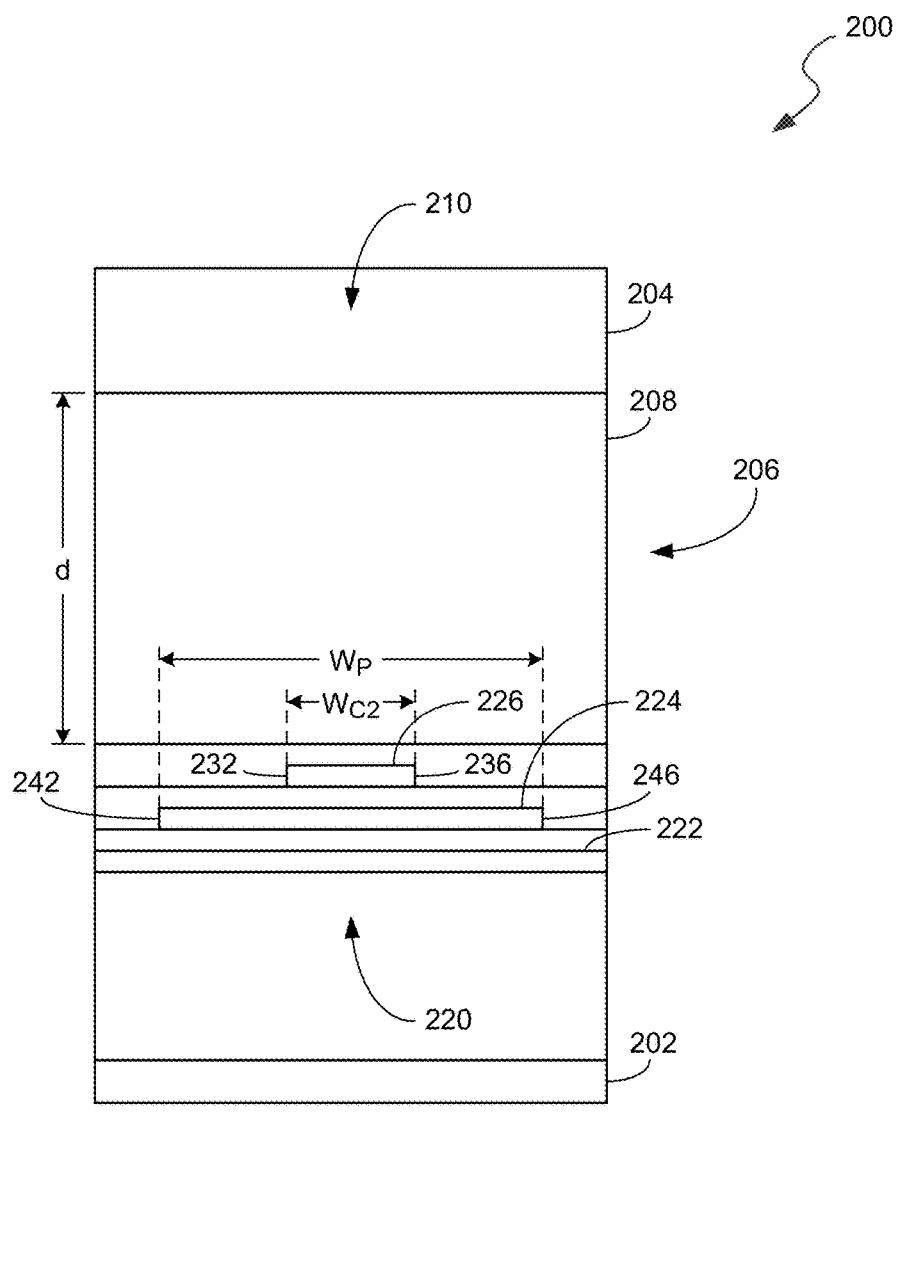
FIG. 2 is a schematic diagram depicting a cross-section of an embodiment of a liquid crystal display device.

FIG. 2 is a schematic diagram depicting a cross-section of an embodiment of a liquid crystal display device (that may implement the array configuration of FIG. 1, for example), in which a display pixel is in an off state. As shown in FIG. 2, display device 200 includes a substrate 202 (sometimes referred to herein as a first or lower substrate) and a substrate 204 (sometimes referred to herein as a second or upper substrate), which is spaced from substrate 202 to define a gap 206 between the substrates. A liquid crystal layer 208 is positioned in gap 206. Liquid crystal layer 208 is associated with a plurality of display pixels, only one of which (i.e., display pixel 210) is depicted in FIG. 2. Each of the display pixels is configured to be switchable between the off state (depicted in FIG. 2) and on state. In some embodiments, each display pixel may include sub-pixels that are configured to display different colors. For example, a display pixel may incorporate a red sub-pixel, a green sub-pixel, and a blue sub-pixel among various other configurations.

Liquid crystal layer 208 is a homogeneous alignment layer formed of nematic liquid crystals. In some embodiments, the nematic liquid crystals may exhibit a positive dielectric anisotropy, whereas, in others, the nematic liquid crystals may exhibit a negative dielectric anisotropy.

The nematic liquid crystals exhibit an anisotropy refractive index ($\Delta n$), with the liquid crystal layer being disposed in gap 206 to a depth (d) (e.g., d is approximately 3 $\mu m$). In some embodiments, a product of the refractive index ($\Delta n$) and the depth (($\Delta n$)×d) is in a range of about 0.15 $\mu m$ to about 0.50 $\mu m$.

As shown in FIG. 2, display pixel 210 also includes an electrode stack 220 disposed between substrate 202 and liquid crystal layer 208. In particular, electrode stack 220 is formed of transparent electrodes, including a first common electrode 222, a pixel electrode 224, and a second common electrode 226. In some embodiments, each of the plurality of transparent electrode stacks of a display device includes only three such electrodes.

In the embodiment of FIG. 2, first common electrode 222 is positioned between substrate 202 and pixel electrode 224, and pixel electrode 224 is positioned between first common electrode 222 and second common electrode 226. Notably, in the cross-section view of FIG. 2 (as well as in plan view, i.e., as viewed along the z-axis), a width of pixel electrode 224 ($w_p$) is wider than a width of second common electrode 226 ($w_{c2}$) as measured along a first direction (e.g., along the x-axis). Additionally, second common electrode 226 is positioned to expose a first portion 228 of pixel electrode 224 at a first side 232 of second common electrode 226 and a second portion 234 of pixel electrode 224 at a second opposing side 236 of second common electrode 226. Stated differently, side 232 of second common electrode 226 is not vertically aligned with side 242 of pixel electrode 224, and side 236 of second common electrode 226 is not vertically aligned with side 246 of pixel electrode 224.

Figure 3:
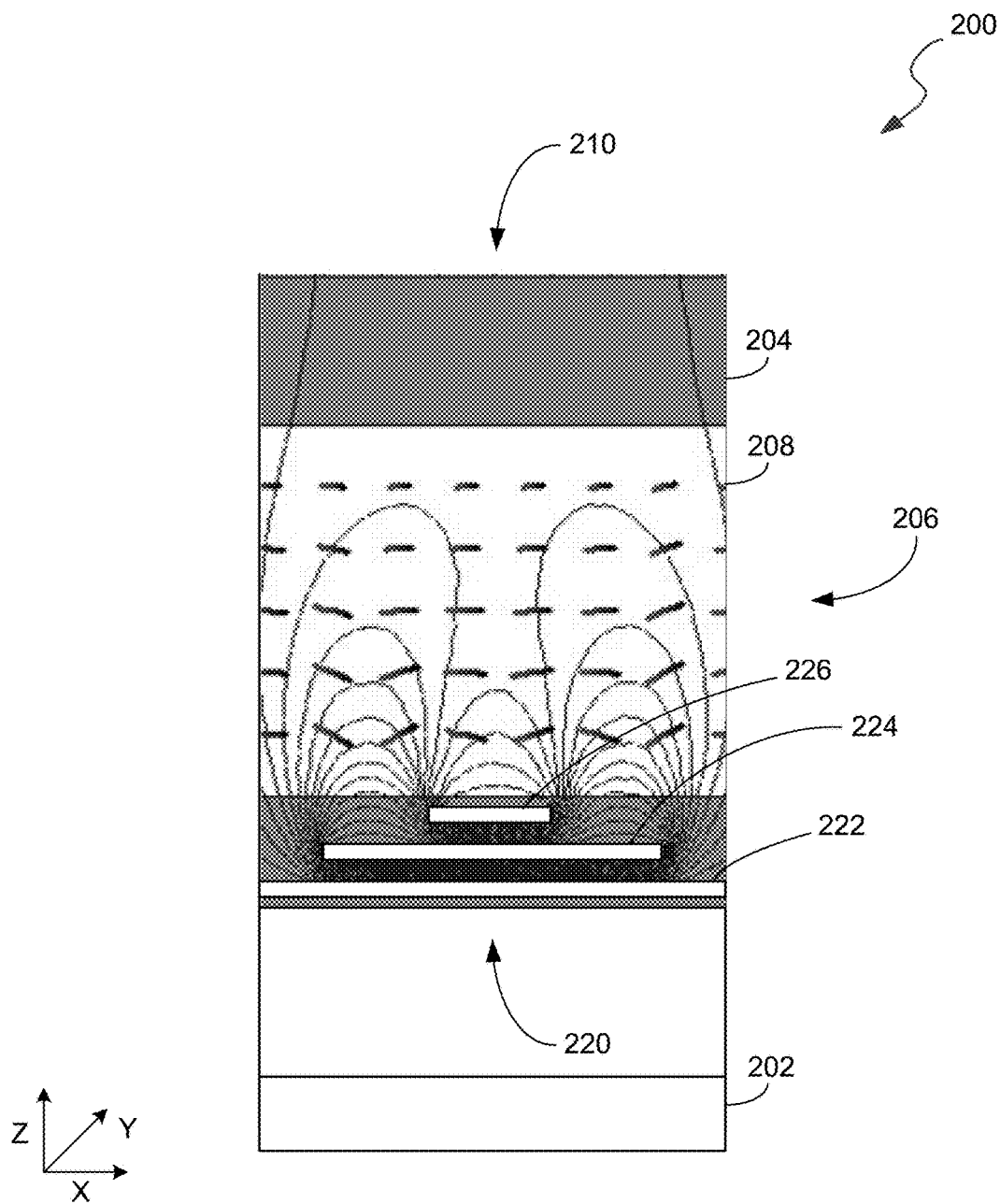
FIG. 3 is a schematic diagram depicting the embodiment of FIG. 2 in an on state.

FIG. 3 depicts the embodiment of FIG. 2 in an on state. In particular, FIG. 3 shows electric field lines (e.g., lines 310 and 312) that emanate from electrode stack 220 when a voltage is applied electrodes 222, 224, and 226. Nematic liquid crystals (e.g., liquid crystals 314 and 316) respond to the electric field by rotating or otherwise orienting themselves based on the orientation and strength of the electric field, thereby altering the transmissivity of display pixel 210. Representative improvements in transmissivity across the width of a display pixel are shown in FIGS. 4 and 5, which depict cross-sections of a prior art liquid crystal display device and the embodiment of FIG. 3, respectively, in on states superimposed with corresponding graphs depicting transmittance across the display pixels.

In FIG. 4, display pixel 400 incorporates a common electrode 402 and a pixel electrode 404. Common electrode 402 is approximately 8 $\mu m$ in width and pixel electrode 404 is approximately 3 $\mu m$ in width and centered over common electrode 402. Characteristically, display pixel 400 exhibits electric field lines (e.g., line 406) with a central lobe 410 extending upwardly (i.e., in the positive z-direction) pixel electrode 404. This configuration results in a transmissivity across the width of the display pixel (i.e., along the x axis) as shown in the corresponding graph. Note that the central lobe 410 of pixel electrode 404 causes a shadowing effect (i.e., localized relative reduction in transmissivity) designated by the "S" arrow.

As shown in FIG. 5, pixel electrode 224 is generally centered over first common electrode 222, and second common electrode 226 is generally centered over pixel electrode 224. Additionally first common electrode 222 is approximately 8 $\mu m$ in width, pixel electrode 224 is approximately 6 $\mu m$ in width, and second common electrode 226 is approximately 2 $\mu m$ in width as measured along the first direction (i.e., along the x-axis). This configuration results in the exposed first portion 228 and the exposed second portion 234 of pixel electrode 224 each being approximately 2 $\mu m$ in width. Further, the configuration results in an exposed first portion 502 and an exposed second portion 504 of first common electrode 222, with each being approximately 1 $\mu m$ in width.

In contrast to the single-lobe electric field configuration exhibited by display pixel 400, display pixel 210 of FIG. 5 exhibits two prominent (major) lobes 510 and 520, with each being associated with a corresponding exposed portion of pixel electrode 224. Specifically, lobe 510 is associated with first portion 228 and lobe 520 is associated with second portion 234. In addition, display pixel 210 exhibits a central (minor) lobe 530 associated with second common electrode 226. The configuration results in a transmissivity across the width of display pixel 210 as shown in the corresponding graph. Note that the lobes 510, 520, and 530 mitigate the shadowing effect, which was readily apparent at distance 4 μm in the previous graph.

Figure 7:
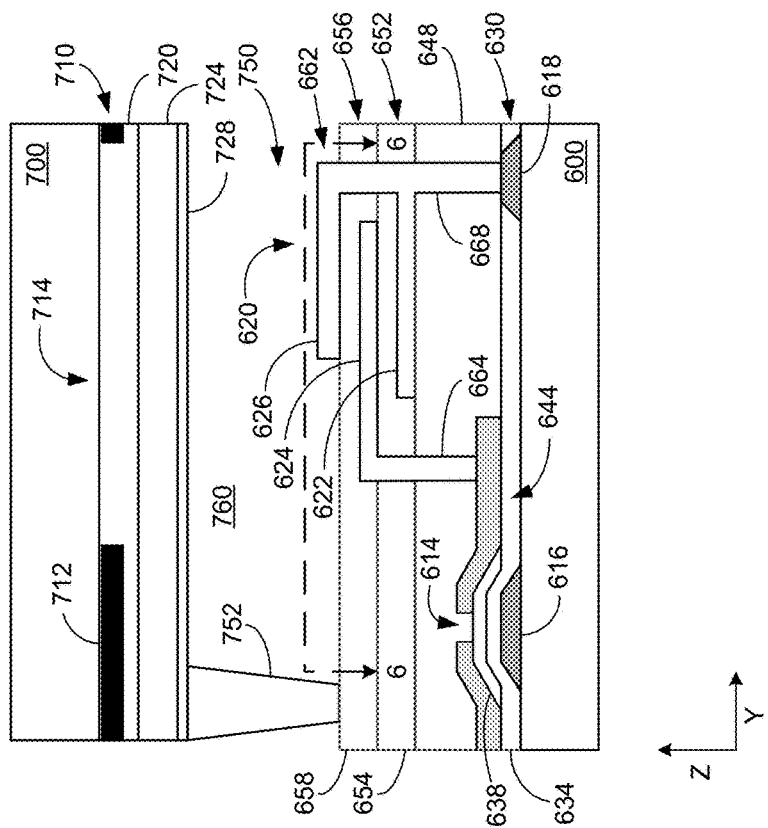
FIG. 7 is a schematic diagram depicting a cross-section of the embodiment of FIG. 6, as viewed along section line 7-7.
Figure 6:
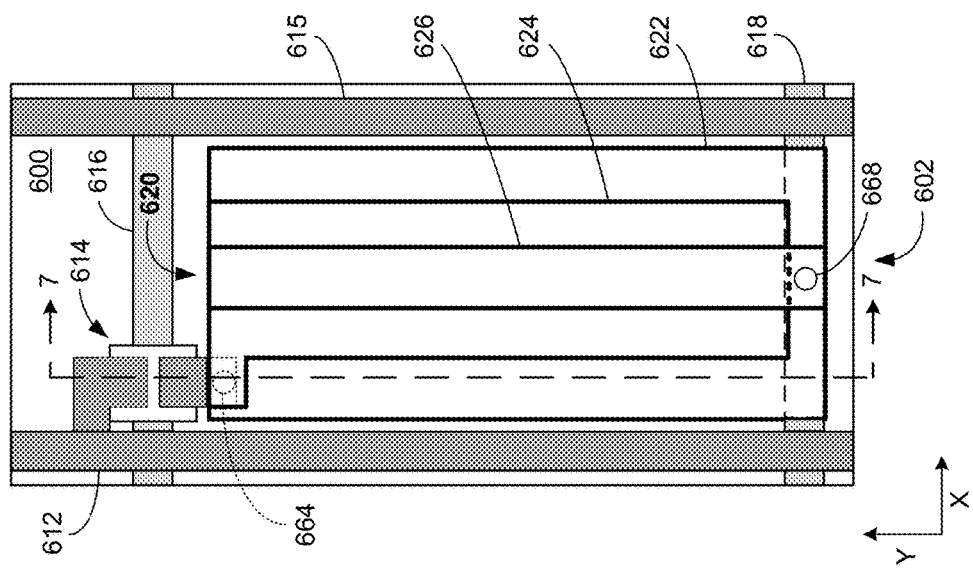
FIG. 6 is a schematic diagram depicting a plan view of an embodiment of a lower substrate and associated features.

With reference to FIGS. 6 and 7, a portion of a lower substrate 600 is depicted upon which an electrode stack 620 is disposed to form a display pixel 602. Electrode stack 620 is associated with a signal (data) line 612 and thin film transistor (TFT) 614, another signal (data) line 615, a gate line 616 and a common line 618, with each being disposed on substrate 600. TFT 614 is electrically connected to gate line 616 and data line 612 at the location where the lines intersect.

Electrode stack 620 incorporates a first common electrode 622, a pixel electrode 624, and a second common electrode 626. In this embodiment, each of the electrodes is configured as a rectangle.

As shown more clearly in FIG. 7, substrate 600 is provided as a support for multiple layers. Specifically, a gate metal layer 630 is disposed on substrate 600 to form a gate line 616 and common line 618. A gate insulator layer 634 (e.g., SiNx, SiOx) is formed over gate metal layer 630. TFT 614 is formed over gate line 616 by depositing amorphous silicon 638 (e.g., N+ doped a:Si, oxide) followed by a material layer 642 to form source/drain regions 644, as well as data line 612.

Following TFT and data line formation, a passivation layer 648 (e.g., SiNx, SiOx) is provided. Electrodes 622, 624, and 626 of electrode stack 620 then are formed over passivation layer 648. In this embodiment, first common electrode 622 is formed by depositing a conductive material layer 652 (e.g., ITO), after which a first insulator layer 654 (e.g., e.g., SiNx, SiOx) is provided. A conductive material layer 656 used to form pixel electrode 624 is then provided, after which a second insulator layer 658 is provided. Second common electrode then is formed over second insulator layer 658 by a conductive material layer 662. It should be noted that passivation layer 648 and insulator layers 654 and 658 are configured to permit electrical connection between TFT 614 and pixel electrode 624, as well as between common line 618 and first and second common electrodes 622, 626. In this embodiment, pixel electrode 624 is connected by a through-hole 664 and the common electrodes 622, 626 are connected by a through-hole 668.

As shown in FIG. 7, a substrate 700 also is provided. Specifically, an opaque material layer 710 is disposed on substrate 700 to form an opaque (e.g., black) matrix 712 that defines interstices (e.g., interstice 714), with one or more interstices being associated with each display pixel of the associated display device. A color filter layer 720 is provided to filter light associated with display pixel 602 as the light propagates outwardly through the interstices. An insulating layer 724 (overcoat) is formed over color filter layer 720, after which a transparent electrode 728 is formed.

Substrates 600 and 700 are positioned to form a gap 750 therebetween. Spacers (e.g., spacer 752) are used to maintain gap 750, with a liquid crystal layer 760 being disposed within the gap.

FIG. 8 depicts a portion of a lower substrate and associated features that are used to form a display pixel similar in many respects to the components depicted in FIGS. 6 and 7. Although a significant configurational difference is present in the embodiment of FIG. 8, as will be described, similar reference numerals are used between the embodiments of FIGS. 6-8 and corresponding descriptions for FIG. 8 are not repeated here. Of note, please recall that electrode stack 620 of FIGS. 6 and 7 includes electrodes 622, 624, and 626, with each exhibiting a rectangular shape. In contrast, in the embodiment of FIG. 8, pixel electrode 624 exhibits an extended end 625 that defines a cut-out 627. Specifically, cut-out 627 is sized and shaped to accommodate passage of through-hole 668 without electrically connecting pixel electrode 624 to the common electrodes 622, 624 or the conductive material in through-hole 668. This configuration permits an expanded coverage area of pixel electrode 624 compared to the embodiment of FIGS. 6 and 7, which involves maintaining the rectangular shape of the side nearest through-hole 668, while terminating pixel electrode 624 along the y axis prior to reaching the through-hole.

FIG. 9 depicts electrode stack 620 of FIG. 8 (in cross-section), which includes first common electrode 622, first insulator layer 654, pixel electrode 624, second insulator layer 658, and second common electrode 626. Specifically, first insulator layer 654 is disposed between first common electrode 622 and 624 pixel electrode, and second insulator layer 658 is disposed between pixel electrode 624 and second common electrode 626.

As shown in FIG. 9, the width ($w_{c1}$) of first common electrode 622 is wider than the width ($w_p$) of pixel electrode 624, and $w_p$ is wider than the width ($w_{c2}$) of second common electrode 626. Additionally, a distance ($S_2$) between a top surface 906 of pixel electrode 624 and a bottom surface 904 of second common electrode 626 is equal to or smaller than a distance ($S_1$) between a top surface 910 of first common electrode and a bottom surface 908 of pixel electrode 624. In some embodiments, distances between the aforementioned surfaces may be set exclusively by thickness of the first and second insulator layers 654, 658. By way of example, a thickness ($t_{I2}$) of the second insulator layer 658 associated with establishing the spacing between pixel electrode 624 and top electrode 626 may be less than a thickness ($t_{I1}$) of the first insulator layer 654. In some embodiments, the thickness ($t_{I1}$) of the first insulator layer 654 is less than 500 nm.

Figures 10, 11, 12:
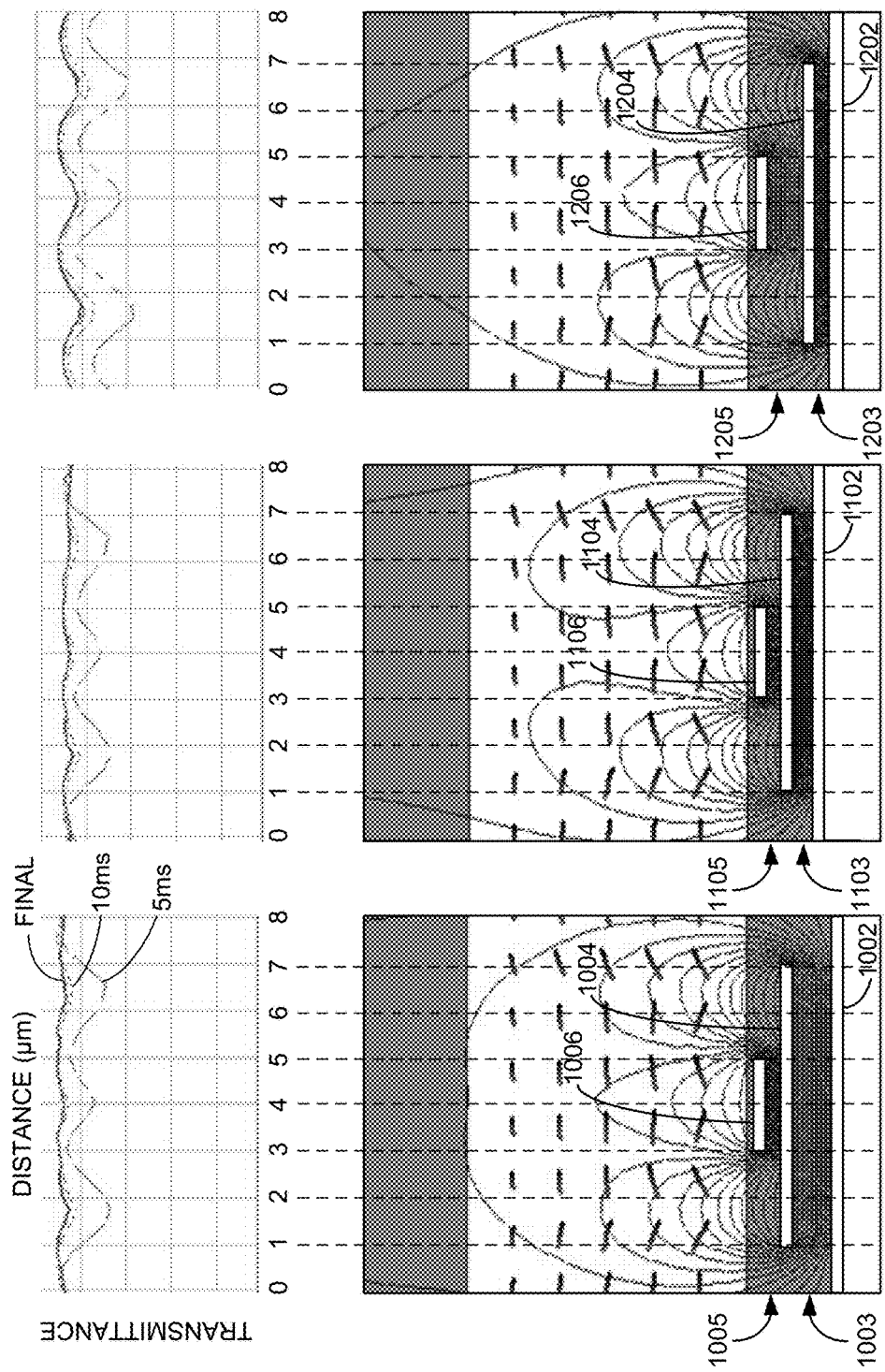
FIGS. 10-12 are schematic diagrams depicting cross-sections of embodiments exhibiting variation in thickness of insulator layers.

FIGS. 10-12 are schematic diagrams depicting cross-sections of embodiments exhibiting variation in thickness of insulator layers, which provides variation in spacing between the common electrodes and the pixel electrodes. Specifically, in FIG. 10, first common electrode 1002 is spaced from pixel electrode 1004 by a first distance that is approximately twice that of a second distance between pixel electrode 1004 and second common electrode 1006. In this embodiment, the first distance is approximately 4000A (which is attributable to a first insulation layer 1003) and the second distance is approximately 2000A (which is attributable to a second insulation layer 1005).

In FIG. 11, first common electrode 1102 is spaced from pixel electrode 1104 by a first distance that is approximately equal to that of a second distance between pixel electrode 1104 and second common electrode 1106. In this embodiment, the first distance is approximately 2000A (which is attributable to a first insulation layer 1103) and the second distance is approximately 2000A (which is attributable to a second insulation layer 1105).

In FIG. 12, first common electrode 1202 is spaced from pixel electrode 1204 by a first distance that is approximately one-half that of a second distance between pixel electrode 1204 and second common electrode 1206. In this embodiment, the first distance is approximately 2000A (which is attributable to a first insulation layer 1203) and the second distance is approximately 4000A (which is attributable to a second insulation layer 1205). It should be noted that when the second distance between a pixel electrode and a corresponding second common electrode is equal to or smaller than the first distance between the pixel electrode and a corresponding first common electrode, transmissivity appears more uniform across the width of the electrode stack.

In some embodiments, the distance ($S_2$) between top surface 906 of pixel electrode 624 and bottom surface 904 of second common electrode 626 is less than or equal to the width ($w_{c2}$) of second common electrode 626. Additionally, or alternatively, the distance ($S_1$) between top surface 910 of first common electrode and bottom surface 908 of pixel electrode 624 is less than or equal to the width ($w_p$) of pixel electrode 624.

In some embodiments, such as when $w_{C1}$ is selected as 8 μm, $w_{C2}$ may vary between approximately 1 μm and approximately 4 μm. Based on these parameters, an example embodiment in which $w_{C2}$ is set at approximately 1 μm and $w_p$ is set at approximately 6 μm (and assuming that pixel electrode 624 is centered above first common electrode 622, and second common electrode 626 is centered above pixel electrode 624) results in a width ($w_{ES2}$) of an exposed side portion 912 (and 914) of pixel electrode 624 at approximately 2.5 μm and a width ($w_{ES1}$) of an exposed side portion 922 (and 924) of first common electrode 622 at approximately 1 μm. As another example embodiment, if $w_{C2}$ is set at approximately 4 μm and $w_p$ is set at approximately 6 μm (and assuming that pixel electrode 624 is centered above first common electrode 622, and second common electrode 626 is centered above pixel electrode 624), width ($w_{ES2}$) of exposed side portion 912 (and 914) of pixel electrode 624 is approximately 1 μm and width ($w_{ES1}$) of exposed side portion 922 (and 924) of first common electrode 622 is approximately 1 μm.

FIGS. 13-15 are schematic diagrams depicting cross-sections of embodiments exhibiting variation in widths of pixel electrodes. Specifically, in FIG. 13, first common electrode 1302 is provided with a width of approximately 8 μm, a pixel electrode 1304 is provided with a width of approximately 6 μm, and a second common electrode 1306 is provided with a width of approximately 3 μm. This configuration results in a width of each of exposed side portions 1312 and 1314 of pixel electrode 1304 being approximately 1.5 μm, and a width of each of exposed side portions 1322 and 1324 of first common electrode 1302 being approximately 1 μm.

In FIG. 14, first common electrode 1402 exhibits a width of approximately 8 μm, pixel electrode 1404 exhibits a width of approximately 6 μm, and second common electrode 1406 exhibits a width of approximately 2 μm. This configuration results in a width of each of exposed side portions 1412 and 1414 of pixel electrode 1404 being approximately 2 μm, and a width of each of exposed side portions 1422 and 1424 of first common electrode 1402 being approximately 1 μm.

In FIG. 15, first common electrode 1502 exhibits a width of approximately 8 μm, pixel electrode 1504 exhibits a width of approximately 6 μm, and second common electrode 1506 exhibits a width of approximately 1 μm. This configuration results in a width of each of exposed side portions 1512 and 1514 of pixel electrode 1504 being approximately 2.5 μm, and a width of each of exposed side portions 1522 and 1524 of first common electrode 1502 being approximately 1 μm. It should be noted that transmissivity appears more uniform when width of a second common electrode is less than or equal to the width of a corresponding exposed portion of the associated first common electrode, with further improvement also possible when the width of the second common electrode is less than or equal to the width of a corresponding exposed portion of the associated pixel electrode.

Figure 16:
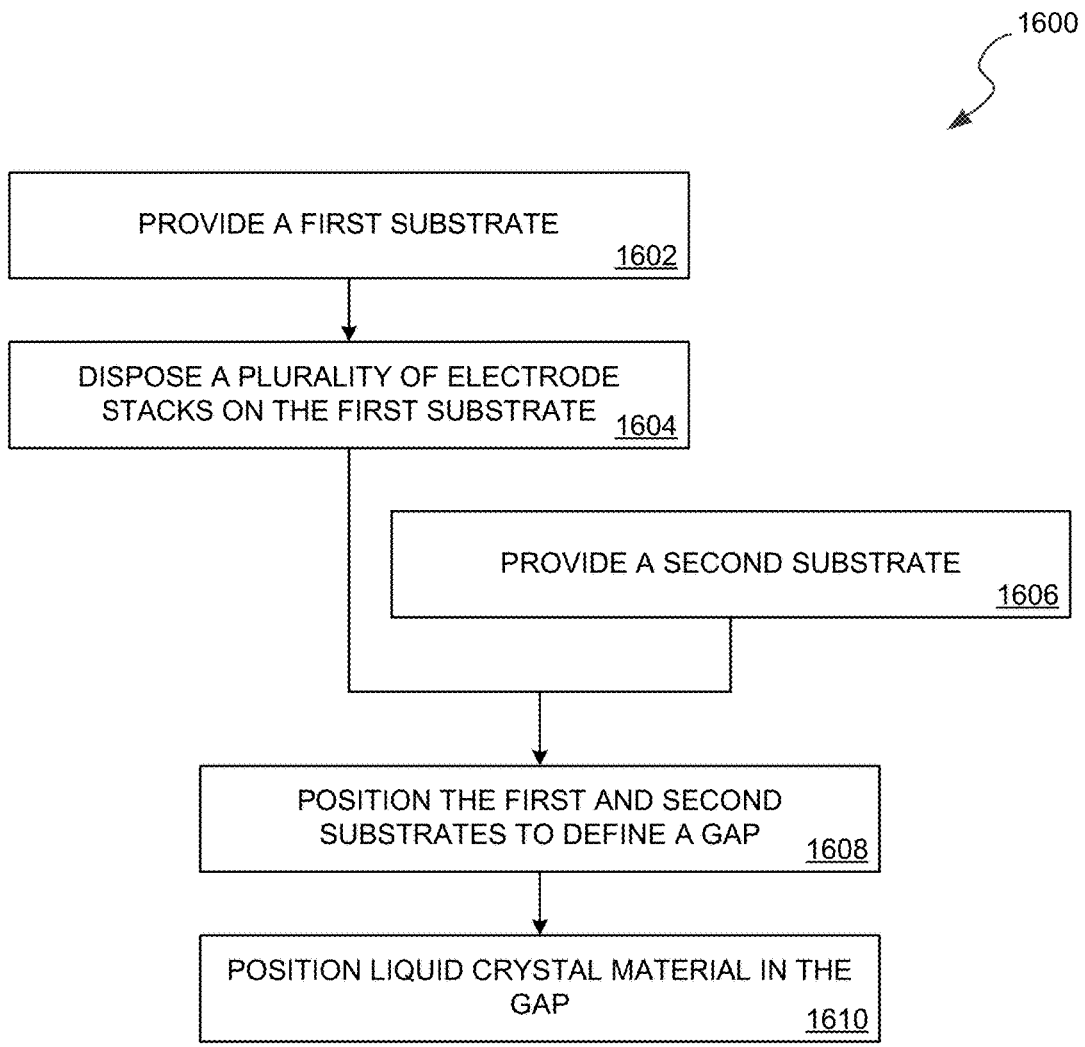
FIG. 16 is a flowchart depicting an embodiment of a method of forming a liquid crystal display device.

FIG. 16 is a flowchart depicting an embodiment of a method of forming a liquid crystal display device, such as a display device incorporating the display pixel configuration of FIG. 2, for example. In this regard, the method 1600 may be construed as beginning at block 1602, in which a first substrate is provided. In some embodiments, the method may additionally include disposing a plurality of gate lines on the first substrate, with the plurality of gate lines extending along a first direction.

In block 1604, a plurality of transparent electrode stacks are disposed on the first substrate. In particular, each of the plurality of transparent electrode stacks incorporates a first common electrode, a pixel electrode, and a second common electrode, with the first common electrode being positioned between the first substrate and the pixel electrode, and the pixel electrode being positioned between the first common electrode and the second common electrode. In some embodiments, the method may additionally include disposing a plurality of common electrode lines on the first substrate, with the plurality of common electrode lines extending along the first direction and each of the plurality of electrode common lines being electrically coupled to the first common electrode and the second common electrode of at least one of the plurality of transparent electrode stacks.

In plan view (e.g., as viewed along the z-axis in FIG. 9, for example), a width of the pixel electrode is wider than a width of the second common electrode as measured along a first direction (e.g., along the x-axis), and the second common electrode is positioned to expose a first portion of the pixel electrode at a first side of the second common electrode and a second portion of the pixel electrode at a second opposing side of the second common electrode. In some embodiments, a width (measured along the first direction) of the pixel electrode is wider than a width of the second common electrode, and a width (measured along the first direction) of the first common electrode is wider than the width the pixel electrode.

In block 1606, a second substrate is provided. In some embodiments, the method may additionally include disposing a black matrix between the second substrate, the black matrix defining interstices, and forming a color filter layer at the interstices of the black matrix. Additionally, or alternatively, the method may include disposing a transparent electrode on the second substrate.

As depicted in block 1608, the first substrate and the second substrate are positioned to define a gap therebetween. In block 1610, a liquid crystal layer is positioned in the gap. Notably, the liquid crystal layer includes a plurality of display pixels with each of the plurality of transparent electrode stacks corresponding to one of the display pixels. So provided, each of the display pixels is configured to be switchable between an on state and an off state.

FIGS. 17-19 are schematic diagrams depicting cross-sections of prior art embodiments exhibiting optical variation due to misalignment of the top electrodes and the corresponding pixel electrode. Specifically, in FIG. 18, a first common electrode 1802 is provided along with a pixel electrode 1804 and two second common electrodes 1806, 1808. In this embodiment, pixel electrode 1804 and the second common electrodes 1806, 1808 are properly aligned over first common electrode 1802. However, as shown in FIG. 17 (which depicts a misalignment of second common electrodes 1806, 1808 by 0.5 μm to the left) and in FIG. 19 (which depicts a misalignment of second common electrodes 1806, 1808 by 0.5 μm to the right), the misalignments results in large optical variation as shown in the corresponding graphs.

Figures 20, 21, 22:
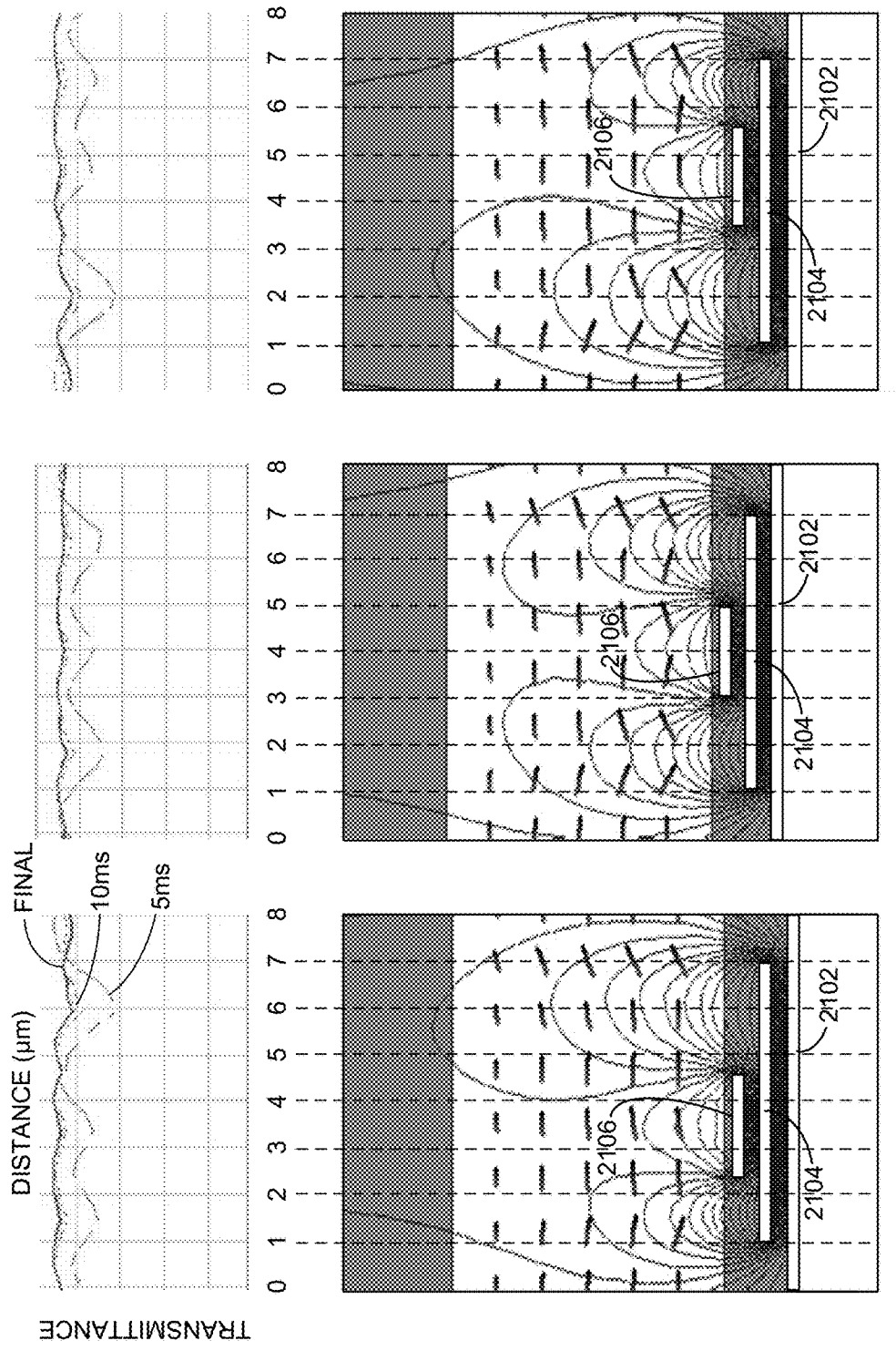
FIGS. 20-22 are schematic diagrams of embodiments exhibiting relative tolerance to misalignment.

In contrast, FIGS. 20-22 depicting the relative tolerance to misalignment of a top electrodes and corresponding pixel electrodes when implementing an embodiment. Specifically, in FIG. 21, a first common electrode 2102 is provided along with a pixel electrode 2104 and a second common electrode 2106. In this embodiment, pixel electrode 2104 and second common electrode 2106 are properly aligned over first common electrode 2102. However, as shown in FIG. 20 (which depicts a misalignment of second common electrode 2106 by 0.5 μm to the left) and in FIG. 22 (which depicts a misalignment of second common electrode 2106 by 0.5 μm to the right), the misalignments results in a reduction in optical variation as shown in the corresponding graphs.

The embodiments described above are illustrative of the invention and it will be appreciated that various permutations of these embodiments may be implemented consistent with the scope and spirit of the invention.

What is claimed is:

1. A liquid crystal display device, comprising:
a first substrate;
a second substrate spaced from the first substrate to define a gap therebetween;
a liquid crystal layer, positioned in the gap, having a plurality of display pixels, wherein each of the display pixels is configured to be switchable between an on state and an off state; and
a plurality of transparent electrode stacks disposed between the first substrate and the liquid crystal layer, with each of the plurality of transparent electrode stacks corresponding to at least one of the display pixels;
wherein each of the plurality of transparent electrode stacks has a first common electrode, a pixel electrode, and a second common electrode, with the first common electrode being positioned between the first substrate and the pixel electrode, and the pixel electrode being positioned between the first common electrode and the second common electrode; and
wherein, in plan view, a width of the pixel electrode is wider than a width of the second common electrode as measured along a first direction, and the second common electrode is positioned to expose a first portion of the pixel electrode at a first side of the second common electrode and a second portion of the pixel electrode at a second opposing side of the second common electrode.

2. The liquid crystal display device of claim 1, wherein each of the plurality of transparent electrode stacks has only three electrodes.

3. The liquid crystal display device of claim 1, wherein:
the liquid crystal display device further comprises a plurality of gate lines disposed on the first substrate; and
the plurality of gate lines extend along the first direction.

4. The liquid crystal display device of claim 3, wherein:
the liquid crystal display device further comprises a plurality of common electrode lines disposed on the first substrate;
the plurality of common electrode lines extend along the first direction; and
each of the plurality of electrode common lines is electrically coupled to the first common electrode and the second common electrode of at least one of the plurality of transparent electrode stacks.

5. The liquid crystal display device of claim 3, wherein a second distance between a top surface of the pixel electrode and a bottom surface of the second common electrode is equal to or smaller than a first distance between a top surface of the first common electrode and a bottom surface of the pixel electrode.

6. The liquid crystal display device of claim 3, wherein, measured along the first direction, a width of the first common electrode is wider than the width the pixel electrode.

7. The liquid crystal display device of claim 6, wherein a second distance between a top surface of the pixel electrode and a bottom surface of the second common electrode is less than or equal to the width of the second common electrode.

8. The liquid crystal display device of claim 7, wherein a first distance between a top surface of the first common electrode and a bottom surface of the pixel electrode is less than or equal to the width of the pixel electrode.

9. The liquid crystal display device of claim 1, wherein each the plurality of transparent electrode stacks further comprises:
a first insulator layer disposed between the first common electrode and the pixel electrode; and
a second insulator layer disposed between the pixel electrode and the second common electrode.

10. The liquid crystal display device of claim 9, wherein a thickness of the second insulator layer is less than a thickness of the first insulator layer.

11. The liquid crystal display device of claim 9, wherein the thickness of the first insulator layer is less than 500 nm.

12. The liquid crystal display device of claim 1, wherein the liquid crystal layer comprises nematic liquid crystals.

13. The liquid crystal display device of claim 12, wherein:
the nematic liquid crystals exhibit a refractive index (Δn);
the liquid crystal layer is disposed in the gap to a depth (d); and
a product of the refractive index and the depth (Δn×d) is in a range of about 0.15 μm to about 0.50 μm.

14. The liquid crystal display device of claim 1, further comprising a black matrix disposed between the second substrate and the liquid crystal layer.

15. The liquid crystal display device of claim 14, wherein:
the black matrix defines interstices; and
the liquid crystal display device further comprises a color filter layer positioned at the interstices of the black matrix.

16. The liquid crystal display device of claim 1, further comprising a transparent electrode disposed between the second substrate and the liquid crystal layer.

17. A method of forming a liquid crystal display device comprising:
providing a first substrate;
disposing a plurality of transparent electrode stacks on the first substrate;
providing a second substrate;
positioning the first substrate and the second substrate to define a gap therebetween; and
disposing a liquid crystal layer in the gap, the liquid crystal layer having a plurality of display pixels with each of the plurality of transparent electrode stacks corresponding to one of the display pixels, wherein each of the display pixels is configured to be switchable between an on state and an off state;
wherein each of the plurality of transparent electrode stacks has a first common electrode, a pixel electrode, and a second common electrode, with the first common electrode being positioned between the first substrate and the pixel electrode, and the pixel electrode being positioned between the first common electrode and the second common electrode; and wherein, in plan view, a width of the pixel electrode is wider than a width of the second common electrode as measured along a first direction, and the second common electrode is positioned to expose a first portion of the pixel electrode at a first side of the second common electrode and a second portion of the pixel electrode at a second opposing side of the second common electrode.

18. The method of claim 17, further comprising disposing a plurality of gate lines on the first substrate, with the plurality of gate lines extending along a first direction.

19. The method of claim 18, wherein:
- a width, measured along the first direction, of the pixel electrode is wider than a width of the second common electrode; and
- a width, measured along the first direction, of the first common electrode is wider than the width the pixel electrode.

20. The method of claim 17, further comprising disposing a plurality of common electrode lines on the first substrate, with the plurality of common electrode lines extending along the first direction and each of the plurality of electrode common lines being electrically coupled to the first common electrode and the second common electrode of at least one of the plurality of transparent electrode stacks.

* * * * *